United States Patent
Kaai et al.

(10) Patent No.: US 11,643,576 B2
(45) Date of Patent: May 9, 2023

(54) PRESSURE-SENSITIVE ADHESIVE COMPOSITION AND PRODUCING METHOD THEREOF

(71) Applicant: TOAGOSEI CO., LTD., Tokyo (JP)

(72) Inventors: Michihiro Kaai, Nagoya (JP); Kenichi Nakamura, Nagoya (JP); Akitsugu Shibata, Nagoya (JP)

(73) Assignee: TOAGOSEI CO. LTD., Tokyo (JP)

( * ) Notice: Subject to any disclaimer, the term of this patent is extended or adjusted under 35 U.S.C. 154(b) by 0 days.

(21) Appl. No.: 16/485,465

(22) PCT Filed: Feb. 9, 2018

(86) PCT No.: PCT/JP2018/004559
§ 371 (c)(1),
(2) Date: Aug. 13, 2019

(87) PCT Pub. No.: WO2018/151034
PCT Pub. Date: Aug. 23, 2018

(65) Prior Publication Data
US 2020/0002580 A1    Jan. 2, 2020

(30) Foreign Application Priority Data

Feb. 14, 2017 (JP) .............................. JP2017-025202

(51) Int. Cl.
C08F 293/00    (2006.01)
C09J 133/08    (2006.01)
C09J 125/08    (2006.01)
C09J 7/38      (2018.01)

(52) U.S. Cl.
CPC ........... *C09J 7/387* (2018.01); *C08F 293/005* (2013.01); *C08F 2438/02* (2013.01); *C09J 2301/414* (2020.08); *C09J 2453/00* (2013.01)

(58) Field of Classification Search
CPC ........ C09J 7/387; C09J 153/00; C09J 133/24; C09J 2453/00
See application file for complete search history.

(56) References Cited

U.S. PATENT DOCUMENTS

| | | |
|---|---|---|
| 2006/0052545 A1 | 3/2006 | Guerret et al. |
| 2008/0275375 A1 | 11/2008 | Guereet et al. |
| 2009/0110849 A1* | 4/2009 | Nishina .............. C08G 18/8029 428/1.31 |
| 2009/0311526 A1 | 12/2009 | Asai et al. |
| 2010/0186895 A1 | 7/2010 | Asai et al. |
| 2011/0061800 A1 | 3/2011 | Asai et al. |
| 2011/0081544 A1 | 4/2011 | Asai et al. |
| 2013/0295349 A1* | 11/2013 | Yamasaki ................. C09J 7/38 428/203 |
| 2016/0194532 A1* | 7/2016 | Kim ....................... C09J 201/02 428/522 |
| 2016/0208149 A1* | 7/2016 | Kawasaki ............ C09J 153/005 |

FOREIGN PATENT DOCUMENTS

| | | |
|---|---|---|
| CN | 1671814 A | 9/2005 |
| CN | 105492474 A | 4/2016 |
| JP | 2003-096421 A | 4/2003 |
| JP | 2003-329837 A | 11/2003 |
| JP | 2006-500433 A | 1/2006 |
| JP | 2006-265461 A | 10/2006 |
| JP | 2007-099985 A | 4/2007 |
| JP | 2007-131763 A | 5/2007 |
| JP | 2007131763 A * | 5/2007 |
| JP | 2009-149849 A | 7/2009 |
| JP | 2010-024435 A | 2/2010 |
| JP | 2013-054517 A | 3/2013 |
| JP | 2013054517 A * | 3/2013 |
| JP | 2013-116935 A | 6/2013 |
| JP | 2015-151452 A | 8/2015 |
| WO | 2015/030207 A1 | 3/2015 |
| WO | WO-2015030207 A1 * | 3/2015 |
| WO | WO-2015080536 A1 * | 6/2015 |

OTHER PUBLICATIONS

Machine translation into English; JP 2007-131763 A; Kamata et al (Year: 2007).*
Machine translation of JP-2013/054517 A; Sugino et al; Mar. 2013 (Year: 2013).*
Jul. 7, 2020 Office Action issued in Japanese Patent Application No. 2018-568497.
Mar. 13, 2018 International Search Report issued in International Patent Application No. PCT/JP2018/004559.
Mar. 13, 2018 Written Opinion issued in International Patent Application No. PCT/JP2018/004559.
Oct. 12, 2020 Office Action issued in Chinese Patent Application No. 201880011543.X.

(Continued)

*Primary Examiner* — Karuna P Reddy
(74) *Attorney, Agent, or Firm* — Oliff PLC

(57) ABSTRACT

A pressure-sensitive adhesive composition includes a block copolymer containing a polymer block (A) and a (meth) acrylic polymer block (B), wherein the polymer block (A) contains either or both of a maleimide compound and an amide group-containing vinyl compound as a constitutional monomer thereof and has a glass transition temperature of 100° C. or higher, and the (meth)acrylic polymer block (B) contains at least one selected from compounds represented by general formula (1) as a major constitutional monomer thereof and has a glass transition temperature of 10° C. or below.

$$CH_2=CR^1-C(=O)O(R^2O)_n-R^3 \qquad (1)$$

(wherein, $R^1$ represents hydrogen or a methyl group; $R^2$ represents a linear or branched $C_{2-6}$ alkylene group; $R^3$ represents hydrogen, a $C_{1-20}$ alkyl group, or a $C_{6-20}$ aryl group; and n represents 0 or an integer from 1 to 100.)

12 Claims, No Drawings

(56) References Cited

OTHER PUBLICATIONS

Feb. 16, 2021 Office Action issued in Japanese Patent Application No. 2018-568497.
Jun. 25, 2021 Office Action issued in Chinese Patent Application No. 201880011543.X.
Dec. 24, 2021 Office Action issued in Chinese Patent Application No. 201880011543.X.
Mar. 30, 2022 Office Action issued in Chinese Patent Application No. 201880011543.X.

* cited by examiner

PRESSURE-SENSITIVE ADHESIVE COMPOSITION AND PRODUCING METHOD THEREOF

TECHNICAL FIELD

The art disclosed in the present disclosure relates to a pressure-sensitive adhesive composition, a producing method thereof, and the like.

BACKGROUND ART

Acrylic adhesives containing acrylic copolymer are already known in a wide range of applications. Such acrylic pressure-sensitive adhesives are being subjected to increased demands for heat resistance (durability) in recent years. For example, an optical pressure-sensitive adhesive that bonds an optical film, e.g., a polarizing plate or retardation film, to a display, e.g., a liquid crystal panel, must continue to maintain adhesiveness even under harsh temperature conditions and humidity conditions, such as in automotive and outdoor displays.

A pressure-sensitive adhesive composition containing an acrylic polymer and an acrylic oligomer has been disclosed as such a pressure-sensitive adhesive composition (Patent Literature 1). Adhesive films that use this pressure-sensitive adhesive composition are described as having excellent durability after heating or humidification. However, a weight-average molecular weight of the acrylic polymer in the pressure-sensitive adhesive composition described in Patent Literature 1 is high at 1,000,000 and above. Due to this, the solution viscosity is high and the fluidity is low, and as a result it has been quite difficult to ensure the processability, for example, the coatability.

In contrast to this, pressure-sensitive adhesive compositions containing a block polymer can be expected to exhibit an excellent adhesive performance even when a molecular weight thereof is relatively low. Pressure-sensitive adhesive compositions containing a block copolymer that contains a styrenic polymer block and an acrylic polymer block has been disclosed as a pressure-sensitive adhesive composition containing a block polymer (Patent Literature 2). This pressure-sensitive adhesive composition is described as having an excellent coatability due to its relatively low molecular weight.

A pressure-sensitive adhesive composition has also been disclosed that contains a block copolymer containing a poly(meth)acrylate block and a polymer block containing, as a constitutional component, a monomer having a glass transition temperature of 20° C. or higher as the homopolymer (Patent Literature 3). This pressure-sensitive adhesive composition is described as having an excellent adhesiveness at high temperatures.

A pressure-sensitive adhesive composition has also been disclosed that contains a block copolymer having a block containing a (meth)acrylate ester and (meth)acrylic acid and a block containing 2-ethylhexyl acrylate (Patent Literature 4). This pressure-sensitive adhesive composition is described as having an excellent heat resistance and adhesiveness.

CITATION LIST

Patent Literature

Citation List
Patent Literature 1: Japanese Patent Application Publication No. 2003-329837
Patent Literature 2: Japanese Patent Application Publication No. 2003-96421
Patent Literature 3: Japanese Patent Application Publication No. 2013-116935
Patent Literature 4: Japanese Patent Application Publication No. 2015-151452

SUMMARY

Technical Problem

However, there is still room for improving heat resistance in the case of the pressure-sensitive adhesive composition described in Patent Literature 2. The pressure-sensitive adhesive composition described in Patent Literature 3 does not exhibit a satisfactory peeling strength at high temperatures or a satisfactory heat-resistant creep behavior. In addition, in the case of the pressure-sensitive adhesive composition described in Patent Literature 4, the peeling strength and heat resistance at high temperatures also do not reach to the levels required for applications of electronic devices or automotive.

The technology disclosed in the present disclosure was developed in light of these circumstances. The present disclosure relates to a pressure-sensitive adhesive composition that contains a block copolymer favorable for the coatability and that can confer a high heat resistance, durability, and peeling resistance, and also relates to a producing method thereof.

Solution to Technical Problem

As a result of exhaustive research, the present inventors discovered that the aforementioned properties are exhibited to an excellent degree by a block copolymer for which a hard segment is a polymer block containing a maleimide compound and/or an amide group-containing vinyl compound. The present disclosure provides the following means.

(1) A pressure-sensitive adhesive composition comprising a block copolymer containing a polymer block (A) and a (meth)acrylic polymer block (B), wherein the polymer block (A) contains either or both of a maleimide compound and an amide group-containing vinyl compound as a constitutional monomer thereof, and has a glass transition temperature of 100° C. or higher, and the (meth)acrylic polymer block (B) contains at least one selected from compounds represented by general formula (1) as a major constitutional monomer, and has a glass transition temperature of 10° C. or below.

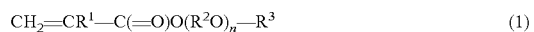
$$CH_2=CR^1-C(=O)O(R^2O)_n-R^3 \qquad (1)$$

(wherein, $R^1$ represents hydrogen or a methyl group; $R^2$ represents a linear or branched $C_{2-6}$ alkylene group; $R^3$ represents hydrogen, a $C_{1-20}$ alkyl group, or a $C_{6-20}$ aryl group; and n represents 0 or an integer from 1 to 100.)

(2) The pressure-sensitive adhesive composition according to (1), wherein the block copolymer contains the polymer block (A) and the (meth)acrylic polymer block (B) at a mass ratio of 2/98 to 50/50.

(3) The pressure-sensitive adhesive composition according to (1) or (2), wherein the polymer block (A) contains 10 mass % or more of a structural unit derived from a maleimide compound.

(4) The pressure-sensitive adhesive composition according to (3), wherein the polymer block (A) further contains 10 mass % or more of a structural unit derived from a styrene compound.

(5) The pressure-sensitive adhesive composition according to any one of (1) to (4), wherein the polymer block (A) and the (meth)acrylic polymer block (B) cause phase separation therebetween.

(6) The pressure-sensitive adhesive composition according to any one of (1) to (5), wherein the block copolymer has a number-average molecular weight of 10,000 to 500,000.

(7) The pressure-sensitive adhesive composition according to any one of (1) to (6), wherein the block copolymer has a weight-average molecular weight/number-average molecular weight of 1.01 to 2.5.

(8) A block copolymer, including a polymer block (A) and a (meth)acrylic polymer block (B), wherein
the polymer block (A) contains either or both of a maleimide compound and an amide group-containing vinyl compound as a constitutional monomer thereof, and has a glass transition temperature of 100° C. or higher, and
the (meth)acrylic polymer block (B) contains at least one selected from compounds represented by general formula (1) as a major constitutional monomer, and has a glass transition temperature of 10° C. or below.

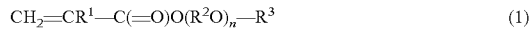
$$CH_2=CR^1-C(=O)O(R^2O)_n-R^3 \quad (1)$$

(wherein, $R^1$ represents hydrogen or a methyl group; $R^2$ represents a linear or branched $C_{2-6}$ alkylene group; $R^3$ represents hydrogen, a $C_{1-20}$ alkyl group, or a $C_{6-20}$ aryl group; and n represents 0 or an integer from 1 to 100.)

(9) A method for producing a block copolymer, comprising:
producing a block copolymer by living radical polymerization, wherein
the block copolymer contains a polymer block (A) and a (meth)acrylic polymer block (B),
the polymer block (A) contains either or both of a maleimide compound and an amide group-containing vinyl compound as a constitutional monomer thereof, and has a glass transition temperature of 100° C. or higher, and
the (meth)acrylic polymer block (B) contains at least one selected from compounds represented by general formula (1) as a major constitutional monomer, and has a glass transition temperature of 10° C. or below.

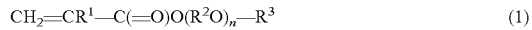
$$CH_2=CR^1-C(=O)O(R^2O)_n-R^3 \quad (1)$$

(wherein, $R^1$ represents hydrogen or a methyl group; $R^2$ represents a linear or branched $C_{2-6}$ alkylene group; $R^3$ represents hydrogen, a $C_{1-20}$ alkyl group, or a $C_{6-20}$ aryl group; and n represents 0 or an integer from 1 to 100).

DESCRIPTION OF EMBODIMENTS

A pressure-sensitive adhesive composition disclosed herein may contain a specific block copolymer. This block copolymer (also referred to in the following simply as the present block copolymer) contains a block copolymer containing a polymer block (A) and a (meth)acrylic polymer block (B).

The present block copolymer can provide a pressure-sensitive adhesive composition that has both an excellent processability and a very high heat resistance and durability.

The present block copolymer preferably has the property wherein the polymer block (A) and the (meth)acrylic polymer block (B) cause phase separation therebetween. In such a case, an even better heat resistance, durability, and peeling resistance can be exhibited due to the formation of a pseudo-crosslinked structure by forming microphase-separated structures.

The following provides a detailed explanation of the present invention. Furthermore, in the present description, the term "(meth)acrylic" refers to acrylic and/or methacrylic, and the term "(meth)acrylate" refers to acrylate and/or methacrylate. In addition, the term "(meth)acryloyl group" refers to acryloyl and/or methacryloyl.

A structure of each block may be the same or may differ when the present block copolymer contains two or more polymer blocks (A) and/or (meth)acrylic polymer blocks (B).

The description that follows describes the block copolymer contained in the pressure-sensitive adhesive composition and a producing method thereof, and then describes the pressure-sensitive adhesive composition.

(Polymer block (A)) The polymer block (A) of the present block copolymer may be a block for which monomer derived from either or both of maleimide compounds and amide group-containing vinyl compounds is a structural unit.

The maleimide compounds may include maleimide and N-substituted maleimide compounds. Examples of the N-substituted maleimide compounds include N-alkyl substituted maleimide compounds such as N-methylmaleimide, N-ethylmaleimide, N-n-propylmaleimide, N-isopropylmaleimide, N-n-butylmaleimide, N-isobutylmaleimide, N-tert-butylmaleimide, N-pentylmaleimide, N-hexylmaleimide, N-heptylmaleimide, N-octylmaleimide, N-laurylmaleimide and N-stearylmaleimide; N-cycloalkyl substituted maleimide compounds such as N-cyclopentylmaleimide and N-cyclohexylmaleimide; and N-aryl substituted maleimide compounds such as N-phenylmaleimide, N-(4-hydroxyphenyl) maleimide, N-(4-acetylphenyl)maleimide, N-(4-methoxyphenyl)maleimide, N-(4-ethoxyphenyl)maleimide, N-(4-chlorophenyl)maleimide, N-(4-bromophenyl)maleimide and N-benzylmaleimide, and one of these or two or more kinds may be used. A structural unit derived from the maleimide compounds can be introduced into the polymer block (A) by the polymerization of monomer that contains the maleimide compound. Of those listed above, a compound represented by the following general formula (2) is preferred for the polymer block (A) from the standpoint of providing the resulting block copolymer with an even better heat resistance and adhesiveness.

[C1]

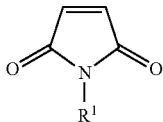

(2)

(wherein, $R^1$ represents a hydrogen, a $C_{1-3}$ alkyl group or $PhR^2$, where Ph represents a phenyl group and $R^2$ represents a hydrogen, a hydroxy group, a $C_{1-2}$ alkoxy group, an acetyl group or halogen).

Examples of the amide group-containing vinyl compound include (meth)acrylamide, (meth)acrylamide derivatives such as tert-butyl(meth)acrylamide, N,N-dimethyl(meth)acrylamide, N,N-diethyl(meth)acrylamide, N-isopropyl(meth)acrylamide, N,N-dimethylaminopropyl(meth)acrylamide, and (meth)acryloylmorpholine; and N-vinylamide monomers such as N-vinylacetamide, N-vinylformamide, and N-vinylisobutyramide, and one of these or two or more kinds may be used. A structural unit derived from the amide group-containing vinyl compounds can be introduced into the polymer block (A) by the polymerization of monomer that contains the amide group-containing vinyl compound.

The structural unit derived from the maleimide compounds and amide group-containing vinyl compounds may be 10 mass % or more and 100 mass % or less of the total structural units of the polymer block (A). This structural unit may be, for example, 15 mass % or more, or, for example, 20 mass % or more, or, for example, 30 mass % or more, or, for example, 40 mass % or more, or, for example, 50 mass % or more, or, for example, 60 mass % or more. In addition, this structural unit may be, for example, 99 mass % or less, or, for example, 90 mass % or less, or, for example, 80 mass % or less, or, for example, 75 mass % or less; or, for example, 70 mass % or less.

If the structural units derived from the maleimide compounds and amide group-containing vinyl compounds are 10 mass % or less, the resulting block copolymer may be insufficiently heat resistance, durability, and peeling resistance.

The polymer block (A) may be a block in which monomer derived from styrene compounds is a structural unit. The styrene compounds may include styrene and derivatives thereof. Examples of specific compounds include styrene, α-methylstyrene, β-methylstyrene, vinyl toluene, vinyl xylene, vinyl naphthalene, o-methylstyrene, m-methylstyrene, p-methylstyrene, o-ethylstyrene, m-ethylstyrene, p-ethylstyrene, p-n-butylstyrene, p-isobutylstyrene, p-t-butylstyrene, o-methoxystyrene, m-methoxystyrene, p-methoxystyrene, o-chloromethylstyrene, p-chloromethylstyrene, o-chlorostyrene, p-chlorostyrene, o-hydroxystyrene, m-hydroxystyrene, p-hydroxystyrene and divinylbenzene, and one of these or two or more kinds may be used. A structural unit derived from a styrene compound can be introduced into the polymer block (A) by the polymerization of monomer that contains the styrene compounds.

Of those listed above, styrene, o-methoxystyrene, m-methoxystyrene, p-methoxystyrene, o-hydroxystyrene, m-hydroxystyrene, and p-hydroxystyrene are preferred from the standpoint of polymerizability. α-methylstyrene, β-methylstyrene and vinyl naphthalene are desirable for increasing a glass transition temperature (Tg) of the polymer block (A) and obtaining a block polymer with excellent heat resistance.

The structural unit derived from the styrene compounds may be 1 mass % or more and 70 mass % or less of the total structural units of the polymer block (A). This structural unit may be, for example, 5 mass % or more, or, for example, 10 mass % or more, or, for example, 20 mass % or more. In addition, this structural unit may be, for example, 60 mass % or less, or, for example, 50 mass % or less, or, for example, 40 mass % or less.

If the structural unit derived from styrene compounds is 1 mass % or more, the polymerizability of the maleimide compounds in particular can be increased. On the other hand, if it is 70 mass % or less, the required amount of the structural unit derived from the maleimide compounds and amide group-containing vinyl compounds can then be ensured, and the block copolymer having an excellent heat resistance, durability, and peeling resistance can be obtained as a result.

In addition, the polymer block (A) may be a block that contains a structural unit derived from vinyl monomers having crosslinkable functional groups (also referred to in the following simply as the crosslinkable structural unit). The crosslinkable structural unit may be introduced, for example, using maleimide compounds and/or amide group-containing vinyl compounds having functional groups such as hydroxy groups, or may be introduced by the copolymerization of vinyl compounds having crosslinkable functional groups.

Vinyl monomers are not particularly limited, and various known monomer compounds may be used, for example, unsaturated carboxylic acids, unsaturated acid anhydrides, hydroxy group-containing vinyl compounds, epoxy group-containing vinyl compounds, vinyl compounds containing a primary amino group or a secondary amino group, reactive silicon group-containing vinyl compounds, oxazoline group-containing vinyl compounds, and isocyanate group-containing vinyl compounds. A single known compound or a combination of two or more known compounds may be used for the polymer block (A).

Examples of the unsaturated carboxylic acids include (meth)acrylic acid, maleic acid, fumaric acid, itaconic acid, crotonic acid, citraconic acid and cinnamic acid, as well as monoalkyl esters of unsaturated dicarboxylic acids (monoalkyl esters of maleic acid, fumaric acid, itaconic acid, citraconic acid, maleic anhydride, itaconic anhydride, citraconic anhydride, etc.). One of these compounds alone or a combination of two or more may be used.

Examples of the unsaturated acid anhydrides include maleic anhydride, itaconic anhydride and citraconic anhydride. One of these compounds alone or a combination of two or more may be used.

Examples of the vinyl compounds containing hydroxy groups include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate and 4-hydroxybutyl (meth)acrylate, as well as mono(meth)acrylic acid esters of polyalkylene glycols such as polyethylene glycol and polypropylene glycol. One of these compounds alone or a combination of two or more may be used.

Examples of the vinyl compounds containing epoxy groups include glycidyl (meth)acrylate, 4-hydroxybutyl (meth)acrylate glycidyl ether and 3,4-epoxycyclohexylmethyl (meth)acrylate. One of these compounds alone or a combination of two or more may be used.

Examples of the vinyl compounds containing primary or secondary amino groups include (meth)acrylic acid esters containing amino groups, such as aminoethyl (meth)acrylate, aminopropyl (meth)acrylate, N-methylaminoethyl (meth)acrylate and N-ethylaminoethyl (meth)acrylate; and (meth)acrylamides containing amino groups, such as aminoethyl (meth)acrylamide, aminopropyl (meth)acrylamide, N-methylaminoethyl (meth)acrylamide and N-ethylaminoethyl (meth)acrylamide.

Examples of the reactive silicon group-containing vinyl compounds include vinyl silanes such as vinyl trimethoxysilane, vinyl triethoxysilane, vinyl methyldimethoxysilane and vinyl dimethylmethoxysilane; silyl group-containing (meth)acrylic acid esters such as trimethoxysilylpropyl (meth)acrylate, triethoxysilylpropyl (meth)acrylate, methyldimethoxysilylpropyl (meth)acrylate and dimethylmethoxysilylpropyl (meth)acrylate; silyl group-containing vinyl ethers such as trimethoxysilylpropyl vinyl ether; and silyl group-containing vinyl esters such as vinyl trimethoxysilylundecanoate. One of these compounds alone or a combination of two or more may be used. The reactive silicon group-containing vinyl compounds are preferred because they enable the facile introduction of two or more crosslinkable functional groups. In addition, the reactive silicon groups in these vinyl compounds can undergo dehydration condensation (polymerization) with each other. This is advantageous as a consequence from the standpoint of making it possible to efficiently carry out the polymerization reaction that produces the block copolymer followed by the aforementioned crosslinking reaction.

Apart from those listed above, oxazoline groups or isocyanate groups may be introduced as the crosslinkable functional groups by the copolymerization of oxazoline group-containing vinyl compounds or isocyanate group-containing vinyl compounds.

Polymerizable unsaturated groups may also be introduced into the polymer block (A) as crosslinkable functional groups using the copolymerization of polyfunctional polymerizable monomers that has two or more polymerizable unsaturated groups in the molecule. This polyfunctional polymerizable monomers include compounds having at least two polymerizable functional groups such as the (meth) acryloyl groups, alkenyl groups in the molecule, and examples include polyfunctional (meth)acrylate compounds, polyfunctional alkenyl compounds, and compounds having both a (meth)acryloyl group and an alkenyl group. Examples include alkylene diol diacrylates such as hexanediol diacrylate as well as compounds having both a (meth) acryloyl group and an alkenyl group in the molecule, e.g., allyl (meth)acrylate, isopropenyl (meth)acrylate, butenyl (meth)acrylate, pentenyl (meth)acrylate, and 2-(2-vinyloxyethoxy)ethyl (meth)acrylate. One of these compounds alone or a combination of two or more may be used.

When the polymer block (A) has crosslinkable structural units, the crosslinkable structural units may be present, for example, 0.01 mol % or more with reference to the total structural units in the polymer block (A). It may be, for example, 0.1 mol % or more, or, for example, 1.0 mol % or more, or, for example, 2.0 mol % or more. Having the crosslinkable structural units be 0.01 mol % or more facilitates obtaining good crosslinked structures and facilitates obtaining block copolymers having a high heat resistance and a high durability. While the upper limit is not particularly limited, from the standpoint of the controllability of the crosslinking reaction, it may be, for example, 60 mol % or less, or, for example, 40 mol % or less, or, for example, 20 mol % or less, or, for example, 10 mol % or less. The range for the crosslinkable structural units may be a suitable combination of the aforementioned lower limit and upper limit, and may be, for example, 1 mol % or more and 60 mol % or less, or, for example, 5 mol % or more and 50 mol % or less, or 10 mol % or more and 40 mol % or less.

Within a range in which the action of the present block copolymer is not detracted, the polymer block (A) may also contain structural units derived from another monomer copolymerizable with the preceding monomers. For example, alkyl (meth)acrylate ester compounds and alkoxyalkyl (meth)acrylate ester compounds may be contained. One of these compounds alone or a combination of two or more may be used.

Examples of the (meth)acrylic acid alkyl ester compounds include linear and branched alkyl ester compounds of (meth) acrylic acid, such as methyl (meth)acrylate, ethyl (meth) acrylate, isopropyl (meth)acrylate, n-propyl (meth)acrylate, n-butyl (meth)acrylate, isobutyl (meth)acrylate, tert-butyl (meth)acrylate, hexyl (meth)acrylate, 2-ethylhexyl (meth) acrylate, n-octyl (meth)acrylate, isooctyl (meth)acrylate, n-nonyl (meth)acrylate, isononyl (meth)acrylate, decyl (meth)acrylate and dodecyl (meth)acrylate; and aliphatic cyclic ester compounds of (meth)acrylic acid, such as cyclohexyl (meth)acrylate, methylcyclohexyl (meth)acrylate, tert-butylcyclohexyl (meth)acrylate, cyclododecyl (meth) acrylate, isobornyl (meth)acrylate, adamantyl (meth)acrylate, dicyclopentenyl (meth)acrylate and dicyclopentanyl (meth)acrylate.

Examples of the (meth)acrylic acid alkoxyalkyl ester compounds include methoxymethyl (meth)acrylate, ethoxymethyl (meth)acrylate, methoxyethyl (meth)acrylate, ethoxyethyl (meth)acrylate, n-propoxyethyl (meth)acrylate, n-butoxyethyl (meth)acrylate, methoxypropyl (meth)acrylate, ethoxypropyl (meth)acrylate, n-propoxypropyl (meth) acrylate, n-butoxypropyl (meth)acrylate, methoxybutyl (meth)acrylate, ethoxybutyl (meth)acrylate, n-propoxybutyl (meth)acrylate and n-butoxybutyl (meth)acrylate.

Apart from those listed above, examples of other monomers include N,N-dimethylaminoethyl (meth)acrylate, N,N-diethylaminoethyl (meth)acrylate and N,N-dimethylaminopropyl (meth)acrylate.

The proportion taken up in the polymer block (A) by the structural unit derived from the above other monomers may be, for example, in the range of 0 mass % or more and 50 mass % or less with reference to the total structural units in the polymer block (A). This proportion may be, for example, 5 mass % or more or, for example, 10 mass % or more. It may be, for example, 45 mass % or less or, for example, 40 mass % or less.

(Glass transition temperature) A glass transition temperature (Tg) of the polymer block (A) is 100° C. or higher. The Tg of the polymer block (A) contributes to the heat resistance of the present block copolymer. Accordingly, the Tg of 100° C. or higher can provide the present block copolymer with an excellent heat resistance. The Tg may be, for example, 120° C. or higher, or, for example, 140° C. or higher, or, for example, 160° C. or higher, or, for example, 180° C. or higher, or, for example, 190° C. or higher, or, for example, 200° C. or higher. The Tg is preferably 350° C. or lower due to restrictions on usable constitutional monomer units. The Tg may be, for example, 280° C. or lower, or, for example, 270° C. or lower, or, for example, 260° C. or lower.

In the present description, as to be described in the examples below, the glass transition temperature of block copolymers as well as the polymer block (A) and the (meth)acrylic polymer block (B) can be measured, by differential scanning calorimetry (DSC). When DSC is not possible, it can also be obtained by calculation from the monomer units constituting the polymer blocks.

(Phase separation behavior) The polymer block (A) preferably has the property of causing phase separation from the (meth)acrylic polymer block (B). microphase-separated structures can be formed due to the presence of this property. A block that causes phase separation from the (meth)acrylic polymer block (B) can be readily designed by the person having ordinary skill in the art based on the common general technical knowledge at the time of the filing of this application. For example, a difference when comparing the SP value calculated by a known calculating method for the solubility parameter, for example, Fedors' method as described below, with the SP value of the (meth)acrylic polymer block (B) may be 0.01 or higher (absolute value). The difference may be, for example, 0.05 or higher, or, for example, 0.1 or higher, or, for example, 0.2 or higher.

Furthermore, the difference may be, for example, 0.5 or higher. In addition, the phase separation behavior between the blocks can be readily estimated, for example, by preparing a polymer blend of the intended polymer block (A) and (meth)acrylic polymer block (B) and mixing these to obtain a structure that is then observed with, e.g., an electron microscope, atomic force microscope, or small-angle x-ray scattering.

The SP value may be calculated by the calculation methods described in R. F. Fedors, "Polymer Engineering and Science" 14(2), 147 (1974). Specifically, it can be calculated by the method shown in formula (1).

[Math. 1]

$$\delta = \sqrt{\frac{\sum \Delta E_{vap}}{\sum V}} \quad (1)$$

$\delta$: SP value $((cal/cm^3)^{1/2})$
$\Delta E_{vap}$: Molar evaporation heat of each atomic group (cal/mol)
V: Molar volume of each atomic group (cm³/mol)

((Meth)acrylic polymer block (B)) The (meth)acrylic polymer block (B) of the present block copolymer may be a block in which at least one selected from compounds represented by general formula (1) is a structural unit. Examples of the compounds represented by general formula (1) include alkyl (meth)acrylate esters, alkoxyalkyl (meth)acrylate esters, and polyalkylene glycol mono(meth)acrylates.

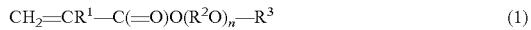

$$CH_2=CR^1-C(=O)O(R^2O)_n-R^3 \quad (1)$$

(wherein, $R^1$ represents hydrogen or a methyl group; $R^2$ represents a linear or branched $C_{2-6}$ alkylene group; $R^3$ represents hydrogen, a $C_{1-20}$ alkyl group, or a $C_{6-20}$ aryl group; and n represents 0 or an integer from 1 to 100.)

Examples of the alkyl (meth)acrylate esters and alkoxyalkyl (meth)acrylate esters may include the alkyl (meth)acrylate esters and alkoxyalkyl (meth)acrylate esters that can be used in the polymer block (A).

For examples of the polyalkylene glycol mono(meth)acrylates, $(R^2O)$ in general formula (1) may be only a single species or may be included two or more species of structural units. When $(R^2O)$ encompasses two or more species, n then represents the sum of the number of repeat units for each structural unit. n may be 1 to 100, or may be 1 to 50, or may be 1 to 30. Examples of specific compounds include polyethylene glycol mono(meth)acrylate, polypropylene glycol mono(meth)acrylate, polyethylene glycol-polypropylene glycol mono(meth)acrylate, polyethylene glycol-polytetraethylene glycol mono(meth)acrylate, methoxypolyethylene glycol mono(meth)acrylate, lauroxypolyethylene glycol mono(meth)acrylate, stearoxypolyethylene glycol mono(meth)acrylate, octoxypolyethylene glycol-polypropylene glycol mono(meth)acrylate, phenoxypolyethylene glycol mono(meth)acrylate, phenoxypolyethylene glycol-polypropylene glycol mono(meth)acrylate, nonylphenoxypolyethylene glycol mono(meth)acrylate, nonylphenoxypolypropylene glycol mono(meth)acrylate, and nonylphenoxypolyethylene glycol-polypropylene glycol mono(meth)acrylate. These compounds are also commercially available, and the "Blemmer PME series" (n=2, 4, 9, 23, 90, and so forth, Blemmer is a registered trademark) is an example of a methoxypolyethylene glycol monomethacrylate.

Besides the preceding, (meth)acrylate ester compounds having functional groups such as amide groups, amino groups, carboxy groups, hydroxy groups may also be used.

Of those listed above, alkyl acrylate ester compounds having $C_{1-12}$ alkyl groups or $C_{2-8}$ alkoxyalkyl groups are preferred for the (meth)acrylic polymer block (B) from the standpoint of obtaining a block copolymer having an excellent flexibility. When the adhesive performance is also considered, the acrylic monomers more preferably contain alkyl acrylate ester compounds having $C_{1-8}$ alkyl group or $C_{2-3}$ alkoxyalkyl groups.

The structural unit derived from the compounds represented by general formula (1) may be 20 mass % or more and 100 mass % or less with reference to the total structural units in the (meth)acrylic polymer block (B). This structural unit may be, for example, 50 mass % or more and 100 mass % or less, or, for example, 80 mass % or more and 100 mass % or less, or, for example, 90 mass % or more and 100 mass % or less. A block copolymer having excellent adhesive properties tends to be obtained when this structural unit is in the indicated range. When this structural unit is 50 mass % or more, the (meth)acrylic polymer block (B) then becomes a block in which at least one selected from compounds represented by general formula (1) is a major constitutional monomer.

In addition, the (meth)acrylic polymer block (B) may be a block that contains crosslinkable structural units. The crosslinkable structural units can be introduced, for example, by the copolymerization of vinyl compounds containing crosslinkable functional groups.

When the (meth)acrylic polymer block (B) contains crosslinkable structural units, the crosslinkable structural units may be present 0.01 mol % or more with reference to the total structural units in the (meth)acrylic polymer block (B). It may be, for example, 0.1 mol % or more, or, for example, 0.5 mol % or more. A block copolymer having an excellent heat resistance is readily obtained by having the amount of introduction of the crosslinkable structural units be 0.01 mol % or more. While the upper limit is not particularly limited, from the standpoint of the flexibility, it may be, for example, 20 mol % or less, or, for example, 10 mol % or less, or, for example, 5 mol % or less. The range for the crosslinkable structural units may be a suitable combination of the indicated lower limit and upper limit, and may be, for example, 0.01 mol % or more and 20 mol % or less, or, for example, 0.1 mol % or more and 10 mol % or less, or, for example, 0.5 mol % or more and 5 mol % or less.

The (meth)acrylic polymer block (B) may also use a monomer other than the aforementioned (meth)acrylic monomer as a structural monomer unit to the extent that this does not detract from the effects disclosed herein. The monomer other than the (meth)acrylic monomer may be a monomer having containing an unsaturated group other than an acryloyl group, and examples include aliphatic or aromatic vinyl compounds such as alkyl vinyl esters, alkyl vinyl ethers and styrene compounds.

(Glass transition temperature) A glass transition temperature (Tg) of the (meth)acrylic polymer block (B) is 10° C. or lower. The Tg of the (meth)acrylic polymer block (B) can contribute to the adhesiveness of the present block copolymer. Accordingly, the Tg of 10° C. or lower can provide the present block copolymer with an excellent adhesiveness. The Tg may be, for example, 0° C. or lower, or, for example, −5° C. or lower, or, for example, −10° C. or lower, or, for example, −20° C. or lower, or, for example, −25° C. or lower, or, for example, −30° C. or lower, or, for example, −35° C. or lower.

(Phase separation behavior) As previously mentioned, the (meth)acrylic polymer block (B) preferably has the property of causing phase separation from the polymer block (A), and advantageously has the prescribed difference from the SP value of the polymer block (A).

(Block copolymer) The present block copolymer may contain at least one polymer block (A) and at least one (meth)acrylic polymer block (B), and examples here are an (AB) diblock form constituted of the polymer block (A) and the (meth)acrylic polymer block (B), an (ABA) triblock form constituted of polymer block (A)/(meth)acrylic polymer block (B)/polymer block (A), and a (BAB) triblock form. The present block copolymer may also have a structure that contains a polymer block (C) in addition to the polymer block (A) and (meth)acrylic polymer block (B), e.g., (ABC) or (ABCA). Among these, the present block copolymer preferably has an A-$(BA)_n$ structure (n is an integer equal to or greater than 1). With such a structure, the polymer block (A) and the (meth)acrylic polymer block (B) form a pseudo-crosslinked structure, which is advantageous with regard to the adhesive properties. This A-$(BA)_n$ structure may be present in all or a portion of the copolymer, and, for example, the copolymer may have a (BABAB) structure.

The mass ratio between the polymer block (A) and the (meth)acrylic polymer block (B) in the present block copolymer is not particularly limited and may be, for example, 2/98 to 50/50. The observance of this range facilitates obtaining a highly heat-resistant and durable adhesive from the polymer block (A), which becomes a crosslink point and constitutes a hard segment, and the (meth)acrylic polymer block (B), which constitutes a soft segment. This mass ratio may be, for example, 10/90 to 40/60. The mass % of the polymer block (A) with reference to the total mass of the present block copolymer is advantageously 5 mass % or more and, for example, is advantageously 10 mass % or more.

A number-average molecular weight (Mn) of the present block copolymer is not particularly limited, but is preferably in the range of 10,000 or more and 500,000 or less. If the number-average molecular weight is 10,000 or more, the present block copolymer can exhibit a satisfactory strength and durability as a pressure-sensitive adhesive. In addition, if the number-average molecular weight is 500,000 or less, an excellent processability, such as fluidity and coatability can be secured. Viewed from the standpoint of the durability, processability, and so forth of the pressure-sensitive adhesive, the number-average molecular weight of the present block copolymer is preferably 50,000 or more, more preferably 100,000 or more, and still more preferably 200,000 or more. In addition, it is preferably 400,000 or less, more preferably 300,000 or less, and still more preferably 250,000 or less.

When a weight-average molecular weight (Mw) of the present block copolymer is divided by the number-average molecular weight (Mn), the resulting molecular weight distribution (Mw/Mn) is preferably 1.5 or less from the standpoint of securing adhesive properties (adhesiveness, cohesiveness, and so forth) through the formation of pseudo-crosslinked structures. More preferably it is 1.4 or less, even more preferably 1.3 or less, and still more preferably 1.2 or less. The molecular weight distribution (Mw/Mn) is preferably 1.01 or more, more preferably 1.05 or more, and still more preferably 1.1 or more.

If the polymer block (A) contains crosslinkable functional groups, a pressure-sensitive adhesive having an even better heat resistance can be obtained by carrying out crosslinking utilizing this crosslinkable functional groups. This crosslinking may proceed via a reaction between crosslinkable functional groups that have been introduced into the polymer block (A) or may proceed via the addition of crosslinking agents that have functional groups capable of reaction with the aforementioned crosslinkable functional groups. When the crosslinking proceeds via a reaction between crosslinkable functional groups that have been introduced into the polymer block (A), the polymerization reaction that produces the present block copolymer and this crosslinking reaction subsequent thereto can be efficiently carried out when reactive silicon groups are used for the crosslinkable functional groups.

<Method for producing block copolymer> A method for producing the present block copolymer disclosed herein is not particularly limited as long as it yields a block copolymer containing the polymer block (A) and the (meth)acrylic polymer block (B), and a known producing method may be adopted. Examples include methods using various controlled polymerization methods such as living radical polymerization and living anionic polymerization, and methods of coupling between polymers having functional groups. Of these, the living radical polymerization method is preferred because the operations are simple, it is applicable to a wide range of monomers, and it is enable a reduction in the metal component content, which can affect the durability at high temperatures, and thereby providing an adhesive with an excellent heat resistance.

A batch process, semi-batch process, dry continuous polymerization process, continuous stirred-tank reactor process (CSTR) or any other process may be used for the living radical polymerization. The polymerization type may be applied to various embodiments such as bulk polymerization without a solvent, solvent-based solution polymerization, emulsion polymerization in an aqueous system, mini-emulsion polymerization and suspension polymerization.

The type of living radical polymerization method is also not particularly limited, and various polymerization methods may be adopted, such as reversible addition-fragmentation chain transfer polymerization (RAFT), nitroxide-mediated radical polymerization (NMP), atom-transfer radical polymerization (ATRP), polymerization using organic tellurium compounds (TERP), polymerization using organic antimony compounds (SBRP), polymerization using organic bismuth compounds (BIRP) and iodine-transfer polymerization methods. Of these, RAFT, NMP and ATRP methods are preferred for ease of polymerization control and implementation.

In the RAFT method, controlled polymerization progresses via a reversible chain transfer reaction in the presence of a specific polymerization control agent (RAFT agent) and an ordinary free radical polymerization initiator. Various known RAFT agents such as dithioester compounds, xanthate compounds, trithiocarbonate compounds and dithiocarbamate compounds may be used as the RAFT agent. The RAFT agent may be a monofunctional agent having only one activation point, or a bifunctional or higher functional agent. A bifunctional RAFT agent is preferred for ease of efficiently obtaining a block copolymer with the aforementioned A-(BA)n type structure.

In addition, the amount of use of the RAFT agent may be adjusted as appropriate in conformity with the target Mn.

A known radical polymerization initiator such as an azo compound, organic peroxide or persulfate salt may be used as a polymerization initiator in polymerization by the RAFT method, but an azo compound is preferred because it is easy to handle safely and side reactions are less likely to occur during radical polymerization. Specific examples of this azo compound include 2,2'-azobisisobutyronitrile, 2,2'-azobis(2,4-dimethylvaleronitrile), 2,2'-azobis(4-methoxy-2,4-dimethylvaleronitrile), dimethyl-2,2'-azobis(2-methylpropionate), 2,2'-azobis(2-methylbutyronitrile), 1,1'-azobis(cyclohexane-1-carbonitrile), 2,2'-azobis[N-(2-propenyl)-2-methylpropionamide] and 2,2'-azobis(N-butyl-2-methylpropionamide). Only one of these radical polymerization initiators, or a combination of two or more may be used.

A ratio of the radical polymerization initiator used is not particularly limited, but for obtaining a polymer with a smaller molecular weight distribution, the amount of the radical polymerization initiator is preferably used in the amount of 0.5 mol or less, or more preferably 0.2 mol or less per 1 mol of the RAFT agent. To achieve a stable polymerization reaction, the lower limit of the amount of the radical polymerization initiator per 1 mol of the RAFT agent is 0.01 mol. Thus, the amount of the radical polymerization initiator used per 1 mol of the RAFT agent is preferably 0.01 mol or more and 0.5 mol or less, or more preferably 0.05 mol or more and 0.2 mol or less.

A reaction temperature in a polymerization reaction by the RAFT method is preferably 40° C. or higher and 100° C. or lower, or more preferably 45° C. or higher and 90° C. or lower, or still more preferably 50° C. or higher and 80° C. or lower. If the reaction temperature is 40° C. or higher, the polymerization reaction can proceed smoothly. Meanwhile, if the reaction temperature is 100° C. or lower, side reactions can be suppressed, and there are fewer restrictions on available initiators and solvents.

In the NMP method, a specific alkoxyamine compound or the like having a nitroxide is used as a living radical polymerization initiator, and polymerization proceeds through a nitroxide radical derived from the initiator. There is no particular limitation in the present disclosure on the species of nitroxide radical that is used, and a commercially available nitroxide-type polymerization initiator may be used. In addition, from the standpoint of polymerization control when polymerizing monomers including an acrylate, it is desirable to use a compound represented by general formula (3) as a nitroxide compound:

[C2]

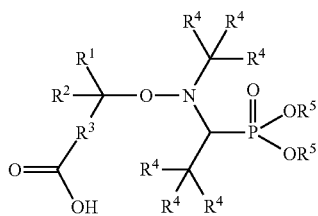

(3)

(wherein, $R^1$ is a $C_{1-2}$ alkyl group or hydrogen atom, $R^2$ is a $C_{1-2}$ alkyl group or nitrile group, $R^3$ is —$(CH_2)_m$-, where m is a number from 0 to 2, and $R^4$ and $R^5$ are $C_{1-4}$ alkyl groups).

The nitroxide compound represented by general formula (3) above undergoes primary dissociation when heated at about 70° C. to 80° C., and initiates an addition reaction with a vinyl monomer. At this occasion, it is possible to obtain a multifunctional polymerization precursor by adding a nitroxide compound to a vinyl monomer having two or more vinyl groups. Living polymerization of the vinyl monomer can then be achieved by subjecting this polymerization precursor to secondary dissociation under heating. At this occasion, since the polymerization precursor has two or more active points in the molecule, a polymer with a narrower molecular weight distribution can be obtained. In view of easily and efficiently obtaining a block copolymer with the aforementioned A-(BA)n type structure, it is desirable to use a bifunctional polymerization precursor having two active points in the molecule. The amount of the nitroxide compound used is adjusted appropriately according to the monomers used and the kind of nitroxide compound and the like.

When the present block copolymer is produced by the NMP method, a nitroxide radical represented by general formula (4) may be added in an amount of 0.001 to 0.2 mol per 1 mol of the nitroxide compound represented by general formula (3) above before polymerization:

[C3]

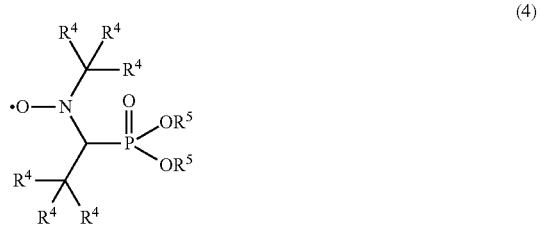

(4)

(wherein $R^4$ and $R^5$ are $C_{1-4}$ alkyl groups).

The time it takes for the concentration of a nitroxide radical to reach a steady state is shortened by adding 0.001 mol or higher of the nitroxide radical represented by general formula (4) above. It is thus possible to control polymerization to a greater degree and obtain a polymer with a narrower molecular weight distribution. However, if too much of this nitroxide radical is added, polymerization may not progress. The added amount of this nitroxide radical per 1 mol of the aforementioned nitroxide compound is more preferably in the range of 0.01 to 0.5 mol, or still more preferably in the range of 0.05 to 0.2 mol.

A reaction temperature in the NMP method is preferably 50° C. or higher and 140° C. or lower, or more preferably 60° C. or higher and 130° C. or lower, or still more preferably 70° C. or higher and 120° C. or lower, or especially 80° C. or higher and 120° C. or lower. If the reaction temperature is 50° C. or higher, the polymerization reaction can progress smoothly. If the reaction temperature is 140° C. or lower, meanwhile, side reactions such as radical chain transfer tend to be suppressed.

In the ATRP method, commonly a polymerization reaction is performed using a transition metal complex as a catalyst with an organic halide initiator. The organic halide initiator may be either monofunctional, or bifunctional or higher functional. In view of easily and efficiently obtaining a block copolymer with the aforementioned A-(BA)n type structure, it is desirable to use a bifunctional compound. Also, a bromide or chloride is preferred as the halide.

A reaction temperature in the ATRP method is preferably 20° C. or higher and 200° C. or lower, or more preferably 50° C. or higher and 150° C. or lower. If the reaction temperature is 20° C. or higher, the polymerization reaction can progress smoothly.

When obtaining an A-(BA)n type structure such as an ABA triblock copolymer consisting of polymer block (A)-(meth)acrylic polymer block (B)-polymer block (A) by living radical polymerization, each block may be polymerized sequentially for example to obtain the target block copolymer. At this occasion, the polymer block (A) is initially obtained using the constitutional monomer for the polymer block (A) in a first polymerization step. Next, in a second polymerization step, the (meth)acrylic polymer block (B) is obtained using the constitutional monomer for the (meth)acrylic polymer block (B). Subsequently, in a third polymerization step, the ABA triblock copolymer can be obtained by carrying out a polymerization using the constitutional monomer for the polymer block (A). At this occasion, the monofunctional polymerization initiator or polymerization precursor described above is preferably used as a polymerization initiator. The second polymerization step and third polymerization step may also be repeated to obtain a higher block copolymer such as a tetrablock copolymer.

On the other hand, producing by a method that includes the two-stage polymerization step to be described below is desirable because it yields the target product more efficiently. That is, in a first polymerization step, a (meth)acrylic polymer block (B) is obtained using the constitutional monomer for the (meth)acrylic polymer block (B), followed by a second polymerization step in which the polymer block (A) is obtained by polymerizing the constitutional monomer for the polymer block (A). It is thus possible to obtain an ABA triblock copolymer consisting of polymer block (A)-(meth)acrylic polymer block (B)-polymer block (A). At this occasion, the polymerization initiator is preferably a bifunctional polymerization initiator or polymerization precursor. With this method, the process is simpler than when producing the copolymer by sequential polymerization of each block. Moreover, the first polymerization step and second polymerization step may also be repeated to obtain a higher block copolymer such as a pentablock copolymer.

In the present disclosure, polymerization of the block copolymer may be performed as necessary in the presence of a chain transfer agent in any polymerization method. A known chain transfer agent may be used, and specific examples include alkylthiol compounds having $C_{2-20}$ alkyl groups, such as ethanethiol, 1-propanethiol, 2-propanethiol, 1-butanethiol, 2-butanethiol, 1-hexanethiol, 2-hexanethiol, 2-methylheptane-2-thiol, 2-butylbutane-1-thiol, 1,1-dimethyl-1-pentanethiol, 1-octanethiol, 2-octanethiol, 1-decanethiol, 3-decanethiol, 1-undecanethiol, 1-dodecanethiol, 2-dodecanethiol, 1-tridecanethiol, 1-tetradecanethiol, 3-methyl-3-undecanethiol, 5-ethyl-5-decanethiol, tert-tetradecanethiol, 1-hexadecanethiol, 1-heptadecanethiol and 1-octadecanethiol, as well as mercaptoacetic acid, mercaptopropionic acid and 2-mercaptoethanol, and one or two or more of these may be used.

In the present disclosure, a known polymerization solvent may be used in living radical polymerization. Specific examples include aromatic compounds such as benzene, toluene, xylene and anisole; ester compounds such as methyl acetate, ethyl acetate, propyl acetate and butyl acetate; ketone compounds such as acetone and methyl ethyl ketone; and dimethylformamide, acetonitrile, dimethylsulfoxide, alcohol and water. Alternatively, polymerization may be carried out in the form of bulk polymerization or the like without using of a polymerization solvent.

<Pressure-sensitive adhesive composition> The present block copolymer may be applied alone as a pressure-sensitive adhesive material, but it may also be in the form of a pressure-sensitive adhesive composition compounded with known additives and the like as necessary. In particular, when the present block copolymer contains a crosslinkable functional group in either one or both of the polymer block (A) and the (meth)acrylic polymer block (B), a crosslinking agent capable of reacting with this crosslinkable functional group can be incorporated. Moreover, as necessary a pressure-sensitive adhesive composition tailored to the application can be obtained by the execution of, for example, a heat treatment.

Examples of the crosslinking agents (curing agents) include glycidyl compounds having two or more glycidyl groups, isocyanate compounds having two or more isocyanate groups, aziridine compounds having two or more aziridinyl groups, oxazoline compounds having an oxazoline group, metal chelate compounds, and butylated melamine compounds. Aziridine compounds, glycidyl compounds, and isocyanate compounds can also be used among these. Of these, isocyanate compounds are preferred from the standpoint of achieving excellent adhesive properties under high temperature conditions.

Examples of the aziridine compounds include 1,6-bis(1-aziridinylcarbonylamino)hexane, 1,1'-(methylene-di-p-phenylene)bis-3,3-aziridylurea, 1,1'-(hexamethylene)bis-3,3-aziridylurea, ethylenebis(2-aziridinylpropionate), tris(1-aziridinyl)phosphine oxide, 2,4,6-triaziridinyl-1,3,5-triazine, and trimethylolpropane tris(2-aziridinylpropionate).

Examples of the glycidyl compounds include multifunctional glycidyl compounds such as ethylene glycol diglycidyl ether, polyethylene glycol diglycidyl ether, propylene glycol diglycidyl ether, polypropylene glycol diglycidyl ether, glycerol diglycidyl ether, neopentyl glycol diglycidyl ether, 1,6-hexanediol diglycidyl ether, tetraglycidylxylenediamine, 1,3-bis(N,N-diglycidylaminomethyl)cyclohexane, trimethylolpropane polyglycidyl ether, diglycerol polyglycidyl ether, polyglycerol polyglycidyl ether, and sorbitol polyglycidyl ether.

For example, compounds having two or more isocyanate groups are used as the isocyanate compounds.

Various aromatic, aliphatic, and alicyclic isocyanate compounds may be used as the isocyanate compounds, as may modifications (e.g., prepolymers) of these isocyanate compounds.

Examples of the aromatic isocyanates include diphenylmethane diisocyanate (MDI), crude diphenylmethane diisocyanate, tolylene diisocyanate, naphthalene diisocyanate (NDI), p-phenylene diisocyanate (PPDI), xylene diisocyanate (XDI), tetramethylxylylene diisocyanate (TMXDI), and tolidine diisocyanate (TODI).

Examples of the aliphatic isocyanates include hexamethylene diisocyanate (HDI), lysine diisocyanate (LDI), and lysine triisocyanate (LTI).

Examples of the alicyclic isocyanates include isophorone diisocyanate (IPDI), cyclohexyl diisocyanate (CHDI), hydrogenated XDI (H6XDI), and hydrogenated MDI (H12MDI).

Examples of the modified isocyanates include urethane modifications, dimers, trimers, carbodiimide modifications, allophanate modifications, biuret modifications, urea modifications, isocyanurate modifications, oxazolidone modifications, and isocyanate group-terminated prepolymers of the aforementioned isocyanate compounds.

When the pressure-sensitive adhesive composition disclosed herein contains a crosslinking agent (curing agent), the content thereof, per 100 mass parts of the block copolymer, may be 0.01 mass parts or more and 10 mass parts or less. It may also be 0.03 mass parts of more and 5 mass parts or less, or 0.05 mass parts or more and 2 mass parts or less.

Otherwise, examples of the aforementioned additives include adhesion promoters, plasticizers, antioxidants, ultraviolet absorbers, ageing inhibitors, flame retardants, antimolds, silane coupling agents, fillers, colorants, and so forth. The amount of additive incorporation, considered with reference to the block copolymer, is preferably 0 mass % or more and 10 mass % or less, more preferably 0 mass % or more and 5 mass % or less, and still more preferably 0 mass % or more and 2 mass % or less.

EXAMPLES

The present disclosure will be hereinafter described in detail based on examples. However, the present disclosure is in no way limited by these examples. Unless otherwise specified, "parts" and "%" below refer to mass parts and mass %.

Methods for analyzing the polymers obtained in the producing examples, examples and comparative examples will be described below.

<Molecular weight measurement> The resulting polymer was subjected to gel permeation chromatography (GPC) under the conditions described below, and the number-average molecular weight (Mn) and weight-average molecular weight (Mw) were obtained as polystyrene equivalents. The molecular weight distribution (Mw/Mn) was then calculated from the resulting values.

Measurement Conditions
Columns: TSKgel SuperMultipore HZ-M manufactured by Tosoh Corporation×4
Solvent: Tetrahydrofuran
Temperature: 40° C.
Detector: RI
Flow rate: 600 µL/min <Compositional ratio of polymer> The compositional ratio of the resulting polymer was identified and calculated by $^1$H-NMR measurement.

<Glass transition temperature (Tg)> The glass transition temperature (Tg) of the resulting polymer was determined from an intersection of a tangent line at an inflection point and a base line of a heat flux curve obtained using a differential scanning calorimeter. The heat flux curve was obtained by cooling about 10 mg of sample to −50° C., maintaining the temperature for 5 minutes, raising the temperature to 300° C. at a rate of 10° C./min, cooling again to −50° C., maintaining that temperature for 5 minutes and then raising it to 350° C. at a rate of 10° C./min.

Measurement equipment: DSC6220 manufactured by SII NanoTechnology Inc.
Measurement environment: Nitrogen atmosphere Inflection points corresponding to the polymer block (A) and the polymer block (B) can be obtained by performing differential scanning calorimetry on each of the resulting block copolymers in the examples and comparative examples, and used to determine the Tg values of each of the polymer blocks.

<<Preparation of RAFT agent>> (Synthesis Example 0: Preparation of 1,4-bis(n-dodecylsulfanylthiocarbonylsulfanylmethyl)benzene) 1-dodecanethiol (42.2 g), 20% KOH aqueous solution (63.8 g) and trioctylmethyl ammonium chloride (1.5 g) were added to an eggplant-shaped flask and cooled in an ice bath, and carbon disulfide (15.9 g) and tetrahydrofuran (hereunder also called "THF") (38 ml) were added and stirred for 20 minutes. A THF solution (170 ml) of α,α'-dichloro-p-xylene (16.6 g) was added dropwise in over the course of 30 minutes. This was reacted for 1 hour at room temperature, extracted from chloroform, washed with pure water, dried with anhydrous sodium sulfate, and was concentrated with a rotary evaporator. The resulting coarse product was purified by column chromatography and was then recrystallized from ethyl acetate to obtain the 1,4-bis(n-dodecylsulfanylthiocarbonylsulfanylmethyl) benzene (hereinafter also called as "DLBTTC") represented by formula (5) below at a yield of 80%. Peaks of the target product were confirmed at 7.2 ppm, 4.6 ppm and 3.4 ppm by $^1$H-NMR.

[C4]

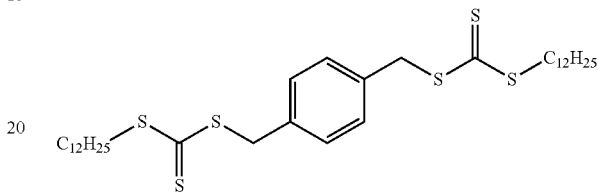

(5)

<<Producing of (meth)acrylic polymer block (B)>> (Synthesis Example 1: Production of polymer A) The RAFT agent (DLBTTC) (1.30 g) obtained in Synthesis Example 0, 2,2'-azobis-2-methylbutyronitrile (hereinafter also referred to as "ABN-E") (0.032 g), methoxyethyl acrylate (200 g), butyl acrylate (200 g), and anisole (170 g) were loaded into a 1 L flask equipped with a stirrer and thermometer and thoroughly deaerated by nitrogen bubbling, and polymerization was initiated in a 60° C. thermostatic tank. After 3 hours, this was cooled to room temperature to stop the reaction. The polymerization solution was then purified by reprecipitation from hexane, and vacuum dried to obtain a polymer A. The molecular weight of the resulting polymer A as measured by GPC was determined to be Mn 192,600, Mw 221,500, Mw/Mn 1.15 (polystyrene equivalents).

(Synthesis Examples 2 to 6: Producing of polymers B, C, D, E, and F) Polymers B to F were obtained by same operations as in Synthesis Example 1, but using the raw materials added as shown in Table 1 and adjusting the reaction times as appropriate. The molecular weights of respective polymer were measured and shown in Table 1.

(Synthesis Example 7: Producing of polymer G) 2-methyl-2-[N-tert-butyl-N-(1-diethylphosphono-2,2-dimethylpropyl)-N-oxyl]propionic acid (2.48 g), hexanediol diacrylate (0.74 g), and isopropyl alcohol (20 g) were loaded into a flask equipped with a stirrer and thermometer and thoroughly deaerated by nitrogen bubbling, and a reaction was initiated in a 100° C. thermostatic tank. After 1 hour, the mixture was cooled to room temperature, and the solvent was distilled off under reduced pressure. N-tert-butyl-1-diethylphosphono-2,2-dimethylpropyl nitroxide (0.03 g), methoxyethyl acrylate (200 g), butyl acrylate (200 g), and anisole (170 g) were added to the residue, which was then thoroughly deaerated by nitrogen bubbling, and polymerization was initiated in a 112° C. thermostatic tank. After 3 hours, this was cooled to room temperature to stop the reaction. The polymerization solution was then purified by reprecipitation from hexane, and vacuum dried to obtain a polymer G. A molecular weight of the resulting polymer G was measured and was shown in Table 1.

TABLE 1

|  |  |  |  | Synthesis Example 1 Polymer A | Synthesis Example 2 Polymer B | Synthesis Example 3 Polymer C | Synthesis Example 4 Polymer D | Synthesis Example 5 Polymer E | Synthesis Example 6 Polymer F | Synthesis Example 7 Polymer G |
|---|---|---|---|---|---|---|---|---|---|---|
| Raw materials added | Pre-reaction | Initiator | SGI-MAA |  |  |  |  |  |  | 2.48 |
|  |  | Monomer | HDDA |  |  |  |  |  |  | 0.74 |
|  |  | Solvent | isopropyl alcohol |  |  |  |  |  |  | 20 |
|  | Polymerization | Monomer | HA |  |  |  |  | 200 |  |  |
|  |  |  | C-1 | 200 | 200 | 200 |  |  |  | 200 |
|  |  |  | nBA | 200 | 200 | 200 | 400 | 200 | 400 | 200 |
|  |  | Control agent | DLBTTC | 1.30 | 0.60 | 4.00 | 0.95 | 1.20 | 1.20 |  |
|  |  | Inititator | SGI |  |  |  |  |  |  | 0.03 |
|  |  |  | ABN-E | 0.032 | 0.015 | 0.100 | 0.024 | 0.030 | 0.030 |  |
|  |  | Solvent | anisole | 170 | 170 | 170 | 170 | 170 | 170 | 170 |
| Molecular weight |  |  | Mn | 192,600 | 395,400 | 63,900 | 255,300 | 204,300 | 208,700 | 55,500 |
|  |  |  | Mw | 221,500 | 474,500 | 70,300 | 306,400 | 249,200 | 252,500 | 72,200 |
|  |  |  | Mw/Mn | 1.15 | 1.20 | 1.10 | 1.20 | 1.22 | 1.21 | 1.30 |

The details for the compounds shown in Table 1 are as follows.

HA: 2-ethylhexyl acrylate
C-1: 2-methoxyethyl acrylate
nBA: n-butyl acrylate
HDDA: 1,6-hexanediol diacrylate
SG1-MAA: 2-methyl-2-[N-tert-butyl-N-(1-diethylphosphono-2,2-dimethylpropyl)-N-oxyl]propionic acid (nitroxide compound producing by Arkema)
SG1: N-tert-butyl-1-diethylphosphono-2,2-dimethylpropyl nitroxide (nitroxide radical producing by Arkema)
ABN-E: 2,2'-azobis(2-methylbutyronitrile)

<<Production of block copolymer>> (Producing Example 1: Production of block copolymer 1) The polymer A obtained in Synthesis Example 1 (100.0 g), ABN-E (0.009 g), N-phenylmaleimide (10.0 g), styrene (6.0 g), and anisole (93 g) were loaded into a 1 L flask equipped with a stirrer and thermometer and were thoroughly deaerated by nitrogen bubbling, and polymerization was initiated in a 70° C. thermostatic tank. After 3 hours, this was cooled to room temperature to stop the reaction. The polymerization solution was then purified by reprecipitation from methanol, and vacuum dried to obtain a block copolymer 1. The molecular weight of the resulting block copolymer 1 was measured and determined to be Mn 222,800, Mw 271,800, Mw/Mn 1.22.

The block copolymer 1 is a triblock copolymer with a structure consisting of polymer block (A)-(meth)acrylic polymer block (B)-polymer block (A). A compositional ratio of N-phenylmaleimide to styrene in the polymer block (A) as calculated by $^1$H-NMR was N-phenylmaleimide/styrene=63/37 mass %, and a compositional ratio of the polymer block (A) to the (meth)acrylic polymer block (B) was (A)/(B)=14/86 mass %.

(Producing Examples 2 to 12 and Producing Comparative Examples 1 and 2: Production of block copolymers 2 to 12, 14, and 15) Block copolymers 2 to 12, 14, and 15 were obtained by the same operations as in Producing Example 1 except that types and amounts of raw materials added to the flask were changed as shown in Table 2, and reaction times were adjusted appropriately. A molecular weight of each block copolymer, a compositional ratio of the polymer block (A) according to 1H-NMR, and a compositional ratio of the polymer block (A) to the (meth)acrylic polymer block (B) in the block copolymer are shown in Table 3.

(Producing Example 13: Production of block copolymer 13) 2-{[(2-carboxyethyl)sulfanylthiocarbonyl]sulfanyl}propanoic acid (0.70 g, monofunctional RAFT agent producing by Wako Pure Chemical Industries, Ltd.), ABN-E (0.07 g), N-phenylmaleimide (25.3 g), styrene (15.4 g) and anisole (150.4 g) were loaded into a 1 L flask equipped with a stirrer and a thermometer and were thoroughly deaerated by nitrogen bubbling, and polymerization was initiated in a 70° C. thermostatic tank. After 2 hours, this was cooled to room temperature to stop the reaction. Then, butyl acrylate (500.8 g) and anisole (80.4 g) were added, the mixture was thoroughly deaerated by nitrogen bubbling, and polymerization was initiated in a 70° C. thermostatic tank. After 7 hours, this was cooled to room temperature to stop the reaction, after which N-phenylmaleimide (25.7 g), styrene (15.3 g) and anisole (155.3 g) were added, the mixture was thoroughly deaerated by nitrogen bubbling, and polymerization was initiated in a 70° C. thermostatic tank. After 8 hours, anisole (195.9 g) was added, and the mixture was cooled to room temperature to stop the reaction. This polymerization solution was purified by reprecipitation from methanol, and vacuum dried to obtain a block copolymer 13. A molecular weight of the resulting block copolymer 13 was measured and determined to be Mn 200,500, Mw 265,000, Mw/Mn 1.29.

The block copolymer 13 is a triblock copolymer with a structure consisting of polymer block (A)-(meth)acrylic polymer block (B)-polymer block (A). A compositional ratio of N-phenylmaleimide to styrene in the polymer block (A) as calculated by $^1$H-NMR was N-phenylmaleimide/styrene=63/37 mass %, and a compositional ratio of the polymer block (A) to the (meth)acrylic polymer block (B) was (A)/(B)=13/87 mass %.

TABLE 2

|  |  |  | Producing Example 1 | Producing Example 2 | Producing Example 3 | Producing Example 4 | Producing Example 5 | Producing Example 6 | Producing Example 7 | Producing Example 8 |
|---|---|---|---|---|---|---|---|---|---|---|
|  | Block copolymer No. |  | 1 | 2 | 3 | 4 | 5 | 6 | 7 | 8 |
| Raw materials added | Monomer | PhMI | 10.0 | 10.0 | 10.0 | 10.0 | 10.0 | 10.0 | 10.0 | 5.0 |
|  |  | St | 6.0 | 6.0 | 6.0 | 6.0 | 6.0 | 6.0 | 6.0 | 3.0 |
|  |  | ACMO |  |  |  |  |  |  |  | 8.0 |
|  |  | MMA |  |  |  |  |  |  |  |  |

TABLE 2-continued

| Polymer | Polymer A | 100.0 | | | | | | | |
|---|---|---|---|---|---|---|---|---|---|
| | Polymer B | | 100.0 | | | | | | |
| | Polymer C | | | 100.0 | | | | | |
| | Polymer D | | | | 100.0 | | | | |
| | Polymer E | | | | | 100.0 | | | |
| | Polymer F | | | | | | 100.0 | | 100.0 |
| | Polymer G | | | | | | | 100.0 | |
| Initiator | ABN-E | 0.009 | 0.0042 | 0.0257 | 0.0064 | 0.008 | 0.008 | 0.030 | 0.008 |
| Solvent | anisole | 93 | 93 | 93 | 93 | 93 | 93 | 93 | 93 |

| | | Producing Example 9 | Producing Example 10 | Producing Example 11 | Producing Example 12 | Producing comparative Example 1 | Producing comparative Example 2 |
|---|---|---|---|---|---|---|---|
| | Block copolymer No. | 9 | 10 | 11 | 12 | 14 | 15 |
| Raw materials added | Monomer PhMI | 5.0 | 5.0 | 15.0 | | | |
| | St | 3.0 | 3.0 | 9.0 | | 16.0 | 9.6 |
| | ACMO | | | | 16.0 | | |
| | MMA | 10.0 | | | | | 6.4 |
| | Polymer Polymer A | | | | | | |
| | Polymer B | | | | | | |
| | Polymer C | | | | | | |
| | Polymer D | | | | | | |
| | Polymer E | | | | | | |
| | Polymer F | 100.0 | 100.0 | 100.0 | 100.0 | 100.0 | 100.0 |
| | Polymer G | | | | | | |
| Initiator | ABN-E | 0.008 | 0.008 | 0.008 | 0.008 | 0.008 | 0.008 |
| Solvent | anisole | 93 | 93 | 93 | 93 | 93 | 93 |

TABLE 3

| | | Producing Example 1 | Producing Example 2 | Producing Example 3 | Producing Example 4 | Producing Example 5 | Producing Example 6 | Producing Example 7 | Producing Example 8 |
|---|---|---|---|---|---|---|---|---|---|
| Polymer block (A) | PhMI | 62.5 | 62.5 | 62.5 | 62.5 | 62.5 | 62.5 | 62.5 | 31.3 |
| | St | 37.5 | 37.5 | 37.5 | 37.5 | 37.5 | 37.5 | 37.5 | 18.8 |
| | ACMO | | | | | | | | 50.0 |
| | MMA | | | | | | | | |
| | Tg (° C.) | 200 | 208 | 190 | 199 | 202 | 199 | 198 | 185 |
| (Meth)acrylic polymer block (B) | Polymer | Polymer A | Polymer B | Polymer C | Polymer D | Polymer E | Polymer F | Polymer G | Polymer F |
| | Tg (° C.) | −35 | −36 | −41 | −49 | −60 | −47 | −37 | −51 |
| Block copolymer | Polymer No. | 1 | 2 | 3 | 4 | 5 | 6 | 7 | 8 |
| | Mn | 222,800 | 456,800 | 73,800 | 295,300 | 236,000 | 241,800 | 64,200 | 239,400 |
| | Mw | 271,800 | 571,000 | 87,800 | 398,700 | 287,900 | 309,500 | 81,500 | 316,000 |
| | Mw/Mn | 1.22 | 1.25 | 1.19 | 1.35 | 1.22 | 1.28 | 1.27 | 1.32 |
| | Block (A) | 14 | 13 | 13 | 14 | 13 | 14 | 14 | 13 |
| | Block (B) | 86 | 87 | 87 | 86 | 87 | 86 | 86 | 87 |

| | | Producing Example 9 | Producing Example 10 | Producing Example 11 | Producing Example 12 | Producing Example 13 | Producing comparative Example 1 | Producing comparative Example 2 |
|---|---|---|---|---|---|---|---|---|
| Polymer block (A) | PhMI | 27.8 | 62.5 | 62.5 | | 62.5 | | |
| | St | 16.7 | 37.5 | 37.5 | | 37.5 | 100.0 | 60.0 |
| | ACMO | | | | 100.0 | | | |
| | MMA | 55.5 | | | | | | 40.0 |
| | Tg (° C.) | 160 | 198 | 198 | 145 | 185 | 95 | 105 |
| (Meth)acrylic polymer block (B) | Polymer | Polymer F | Polymer F | Polymer F | Polymer F | | Polymer F | Polymer F |
| | Tg (° C.) | −50 | −48 | −48 | −50 | −46 | −50 | −50 |
| Block copolymer | Polymer No. | 9 | 10 | 11 | 12 | 13 | 14 | 15 |
| | Mn | 223,900 | 225,100 | 257,300 | 240,400 | 205,000 | 238,800 | 239,800 |
| | Mw | 300,000 | 288,100 | 337,100 | 310,100 | 265,000 | 322,400 | 330,900 |
| | Mw/Mn | 1.34 | 1.28 | 1.31 | 1.29 | 1.29 | 1.35 | 1.38 |
| | Block (A) | 14 | 7 | 19 | 13 | 13 | 13 | 13 |
| | Block (B) | 86 | 93 | 81 | 87 | 87 | 87 | 87 |

The details of the compounds shown in Tables 2 and 3 are as follows.

PhMI: phenylmaleimide
St: styrene
ACMO: acryloylmorpholine
MMA: methyl methacrylate <<Preparation and evaluation of pressure-sensitive adhesive compositions>> (Example 1) A pressure-sensitive adhesive composition was prepared by dissolving, as the base resin, the block copolymer 1 obtained in Producing Example 1 in ethyl acetate to give a polymer solution having a solids concentration of 30 mass %. This pressure-sensitive adhesive composition was coated, so as to provide a thickness after drying of 50 μm, on a polyethylene terephthalate (PET) separator having a thickness of 38 μm. The ethyl acetate was removed by drying the pressure-sensitive adhesive composition for 4 minutes at 80° C., and to the separator was applied a 38 μm-thick PET separator having a different peeling strength to prepare an adhesive film specimen having a separator applied on both sides. Adhesive properties of the obtained adhesive film specimen were measured using methods described in the following. The results are shown in Table 4.

(Examples 2 to 13 and Comparative Examples 1 and 2) Using the block copolymers obtained in Producing Examples 2 to 13 and Producing Comparative Examples 1 and 2, pressure-sensitive adhesive compositions were prepared and adhesive film specimens were fabricated as in Example 1. Adhesive properties of the obtained adhesive film specimens were measured using the methods described in the following. The results are shown in Table 4.

"Testing methods of pressure-sensitive adhesive tapes and sheets" at 23° C. and 85° C. using a Strograph R tensile tester equipped with a thermostatted tank (manufacturing by Toyo Seiki Seisaku-sho, Ltd.). The peeling speed was 300 mm/min.

<Durability after application of glass/polycarbonate> A glass plate was applied to one side of the adhesive film specimen and a polycarbonate (PC) plate was applied to the other side of that to prepare a laminate (area of adhesion: 50 mm×60 mm), and this laminate was subjected to a press-bonding treatment for 20 minutes under conditions of 50° C. and 0.5 MPa. A load was subsequently applied to the laminate for 100 hours at 85° C., and the post-loading appearance (peeling from edges) was visually checked and a maximum distance within locations where peeling had been occurred was measured. A lower peeled distance is evaluated as a better durability.

<Evaluation of creep resistance> An adhesive sheet for evaluation was obtained by transferring the adhesive film specimen to a PET film (100 μm) that had been treated to facilitate adhesion. This adhesive sheet for evaluation was pasted onto a stainless steel plate to provide an area of adhesion of 25 mm×25 mm; press-bonding was carried out for 20 minutes under conditions of 0.5 MPa and 50° C. using a TBR-200 desktop pressure-application/deaeration apparatus (manufacturing by Chiyoda Denki Kogyo Co., Ltd.); and the resulting test specimen was installed in a creep tester. Under an environment of 100° C., 150° C., or 170° C., the time was measured until the PET film, to which a 1 kg weight had been attached, dropped from the stainless-steel plate. When the PET film had not dropped from the stain-

TABLE 4

|  |  | Example 1 | Example 2 | Example 3 | Example 4 | Example 5 | Example 6 | Example 7 | Example 8 |
|---|---|---|---|---|---|---|---|---|---|
| Block copolymer No. |  | 1 | 2 | 3 | 4 | 5 | 6 | 7 | 8 |
| Adhesive strength | 23° C. | 32 | 35 | 25 | 28 | 24 | 27 | 17 | 27 |
| versus glass (N/25 mm) | 85° C. | 7 | 9 | 6 | 6 | 5 | 8 | 4 | 4 |
| Durability glass/polycarbonate | 85° C. × 100 h | 0.0 mm | 0.0 mm | 0.1 mm | 0.0 mm | 0.0 mm | 0.0 mm | 0.1 mm | 0.0 mm |
| creep resistance | 100° C. × 1 kg | 0 mm | 0 mm | 0 mm | 0 mm | 0 mm | 0 mm | 0 mm | 0 mm |
|  | 150° C. × 1 kg | 0 mm | 0 mm | 0 mm | 0 mm | 0 mm | 0 mm | 0 mm | 0 mm |
|  | 170° C. × 1 kg | 0 mm | 0 mm | 2 mm | 0 mm | 0 mm | 0 mm | 2 mm | 0 mm |

|  |  | Example 9 | Example 10 | Example 11 | Example 12 | Example 13 | Comparative Example 1 | Comparative Example 2 |
|---|---|---|---|---|---|---|---|---|
| Block copolymer No. |  | 9 | 10 | 11 | 12 | 13 | 14 | 15 |
| Adhesive strength | 23° C. | 27 | 35 | 21 | 20 | 29 | 18 | 16 |
| versus glass (N/25 mm) | 85° C. | 3 | 3 | 6 | 2 | 7 | 0.8 | 0.5 |
| Durability glass/polycarbonate | 85° C. × 100 h | 0.8 mm | 0.7 mm | 0.0 mm | 1.3 mm | 0.0 mm | >2.0 mm | >2.0 mm |
| creep resistance | 100° C. × 1 kg | 0 mm | 0 mm | 0 mm | 1 mm | 0 mm | 2 mm | 2 mm |
|  | 150° C. × 1 kg | 0 mm | 1 mm | 0 mm | 3 mm | 0 mm | <1 min | <1 min |
|  | 170° C. × 1 kg | 2 mm | 3 mm | 0 mm | 4 mm | 0 mm | <1 min | <1 min |

<Adhesive strength versus glass> An adhesive sheet for evaluation was obtained by transferring the obtained adhesive film specimen to a PET film (100 μm) that had been treated to facilitate adhesion. This adhesive sheet for evaluation was pasted onto a glass sheet (Fabritech FL11A, 1 mm thick, producing by Asahi Glass Co., Ltd.) serving as the adherend; press-bonding was carried out for 20 minutes under conditions of 0.5 MPa and 50° C. using a TBR-200 desktop pressure-application/deaeration apparatus (manufacturing by Chiyoda Denki Kogyo Co., Ltd.); and the adhesive strength was then obtained by measuring the 180° peeling strength of the adhesive sheet based on JIS Z 0237 less-steel plate even after the elapse of 1 hour, the slippage of the PET film after the elapse of 1 hour was measured (distance from the position before the test). The drop time (min) or slippage (mm) is used as an index of the creep resistance, and a smaller slippage indicates a better creep resistance. In addition, when the PET film dropped from the stainless-steel plate, a longer drop time indicates a better creep resistance. A slippage of 2 mm or less was regarded as passing.

<Observation of microphase-separated structure> Under electron microscopic observation, a microphase-separated structure could be observed in all of the sheets obtained from the curable resin compositions that used the block copolymers of Examples 1 to 13. In the examples, microdomains presumed to originate with the polymer block (A) could be observed, as could microdomains presumed to originate with the (meth)acrylic polymer block (B). In contrast to this, a microphase-separated structure could not be observed in the sheets obtained from the copolymers of Comparative Examples 1 and 2.

<<Results of evaluations of adhesive properties>> As shown in Table 4, excellent adhesive properties (heat resistance, durability, creep resistance) were exhibited by the adhesive film specimens that used the block copolymers of Examples 1 to 13. In contrast to this, only unsatisfactory properties were obtained for the adhesive properties for both of the adhesive films that used the block copolymers of Comparative Examples 1 and 2.

The results for Examples 1 to 13 demonstrated that the adhesive properties could be exhibited at an even higher level of excellence when a monomer derived from a maleimide compound is contained as a structural unit in the polymer block (A) and the polymer block (A) is contained at 10 mass % or more with reference to the overall mass of the block copolymer. It was demonstrated that the adhesive properties could be exhibited at an even higher level of excellence when, viewed in terms of the number-average molecular weight, this was 200,000 or more.

INDUSTRIAL APPLICABILITY

The present block copolymer has an excellent processability while also exhibiting a very good heat resistance, durability, and creep resistance. It is thus useful as an optical pressure-sensitive adhesive for use in bonding an optical film, e.g., a polarizing plate or retardation film, to a display, e.g., a liquid crystal panel, and is broadly applicable in fields where use is subject to harsh temperature conditions and humidity conditions, such as in automotive and outdoor displays.

The invention claimed is:

1. A pressure-sensitive adhesive composition comprising a block copolymer containing a polymer block (A) and a (meth)acrylic polymer block (B),
   wherein the polymer block (A) consists of a structural unit derived from a maleimide compound in an amount of 40 mass % or more and 80 mass % or less and a structural unit derived from a styrene compound in an amount of 20 mass % or more and 60 mass % or less, and has a glass transition temperature of 140° C. or higher,
   the (meth)acrylic polymer block (B) contains at least one structural unit derived from an alkyl (meth)acrylate ester compound and at least one structural unit derived from an alkoxyalkyl (meth)acrylate ester compound, and has a glass transition temperature of 10° C. or below,
   the alkyl (meth)acrylate ester compound is an alkyl acrylate ester compound having $C_{1-8}$ alkyl group and the alkoxyalkyl (meth)acrylate ester compound is an alkoxyalkyl acrylate ester compound having $C_{2-8}$ alkoxyalkyl group,
   the block copolymer has a weight-average molecular weight/number-average molecular weight of 1.01 to 2.5 and a number-average molecular weight of 50,000 to 500,000, and contains the polymer block (A) and the (meth)acrylic polymer block (B) at a mass ratio of 5/95 or more and less than 15/85, and
   the block copolymer has an ABA triblock form.

2. The pressure-sensitive adhesive composition according to claim 1, wherein the maleimide compound is N-aryl substituted maleimide compound.

3. The pressure-sensitive adhesive composition according to claim 1, wherein the block copolymer has a number-average molecular weight of 100,000 to 500,000.

4. The pressure-sensitive adhesive composition according to claim 2, wherein the block copolymer has a number-average molecular weight of 100,000 to 500,000.

5. The pressure-sensitive adhesive composition according to claim 1, wherein the polymer block (A) has a glass transition temperature of 180° C. or higher.

6. The pressure-sensitive adhesive composition according to claim 2, wherein the polymer block (A) has a glass transition temperature of 180° C. or higher.

7. The pressure-sensitive adhesive composition according to claim 3, wherein the polymer block (A) has a glass transition temperature of 180° C. or higher.

8. The pressure-sensitive adhesive composition according to claim 2, wherein the polymer block (A) consists of the structural unit derived from the maleimide compound and the structural unit derived from the styrene compound, the block copolymer has a number-average molecular weight of 100,000 to 500,000, and the polymer block (A) has a glass transition temperature of 180° C. or higher.

9. The pressure-sensitive adhesive composition according to claim 1, wherein the polymer block (A) has a glass transition temperature of 190° C. or higher.

10. The pressure-sensitive adhesive composition according to claim 2, wherein the polymer block (A) has a glass transition temperature of 190° C. or higher.

11. The pressure-sensitive adhesive composition according to claim 3, wherein the polymer block (A) has a glass transition temperature of 190° C. or higher.

12. The pressure-sensitive adhesive composition according to claim 2, wherein the block copolymer has a number-average molecular weight of 100,000 to 500,000 and the polymer block (A) has a glass transition temperature of 190° C. or higher.

* * * * *